United States Patent
Arimatsu

(10) Patent No.: US 11,073,497 B2
(45) Date of Patent: Jul. 27, 2021

(54) MACHINE TOOL AND VIBRATION DIAGNOSIS SUPPORT METHOD

(71) Applicant: FANUC CORPORATION, Yamanashi (JP)

(72) Inventor: Yohei Arimatsu, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 140 days.

(21) Appl. No.: 16/676,486

(22) Filed: Nov. 7, 2019

(65) Prior Publication Data
US 2020/0150094 A1     May 14, 2020

(30) Foreign Application Priority Data

Nov. 13, 2018   (JP) ............................. JP2018-212744

(51) Int. Cl.
| | |
|---|---|
| *G01H 13/00* | (2006.01) |
| *B23Q 17/12* | (2006.01) |
| *G01N 29/44* | (2006.01) |
| *G01H 1/00* | (2006.01) |
| *G01N 29/12* | (2006.01) |

(52) U.S. Cl.
CPC ............. *G01N 29/12* (2013.01); *B23Q 17/12* (2013.01); *G01H 1/003* (2013.01); *G01H 13/00* (2013.01); *G01N 29/4454* (2013.01)

(58) Field of Classification Search
CPC ........... G01N 29/4427; G01N 29/4445; G01N 29/12; G01N 2291/0258; G01H 13/00
USPC .......................................................... 73/579
See application file for complete search history.

(56) References Cited

U.S. PATENT DOCUMENTS

| | | | | |
|---|---|---|---|---|
| 8,504,307 | B2* | 8/2013 | Norihisa | G05B 19/4065 |
| | | | | 702/34 |
| 9,791,103 | B2* | 10/2017 | Iijima | G05B 23/0256 |
| 10,025,296 | B2* | 7/2018 | Iijima | G05B 19/416 |
| 10,481,578 | B2* | 11/2019 | Bitterolf | G05B 19/401 |
| 2016/0170400 | A1 | 6/2016 | Iijima | |
| 2018/0169814 | A1* | 6/2018 | Sugiura | H02P 6/28 |

FOREIGN PATENT DOCUMENTS

| | | | |
|---|---|---|---|
| JP | 357048450 | * | 3/1982 |
| JP | 2016-111897 A | | 6/2016 |
| WO | WO2012057235 | * | 5/2012 |

* cited by examiner

*Primary Examiner* — Jacques M Saint Surin
(74) *Attorney, Agent, or Firm* — Robert P. Michal, Esq.; Carter, DeLuca & Farrell LLP

(57) ABSTRACT

A machine tool includes: a first calculator configured to calculate a first frequency characteristic based on a first oscillation signal and a measurement signal of a physical quantity measured by a measurement unit when the drive shaft of a servo motor swings in accordance with the first oscillation signal; and a second calculator configured to calculate a second frequency characteristic based on a second oscillation signal and a measurement signal of the physical quantity measured by the measurement unit when the drive shaft of the servo motor swings in accordance with the second oscillation signal.

16 Claims, 7 Drawing Sheets

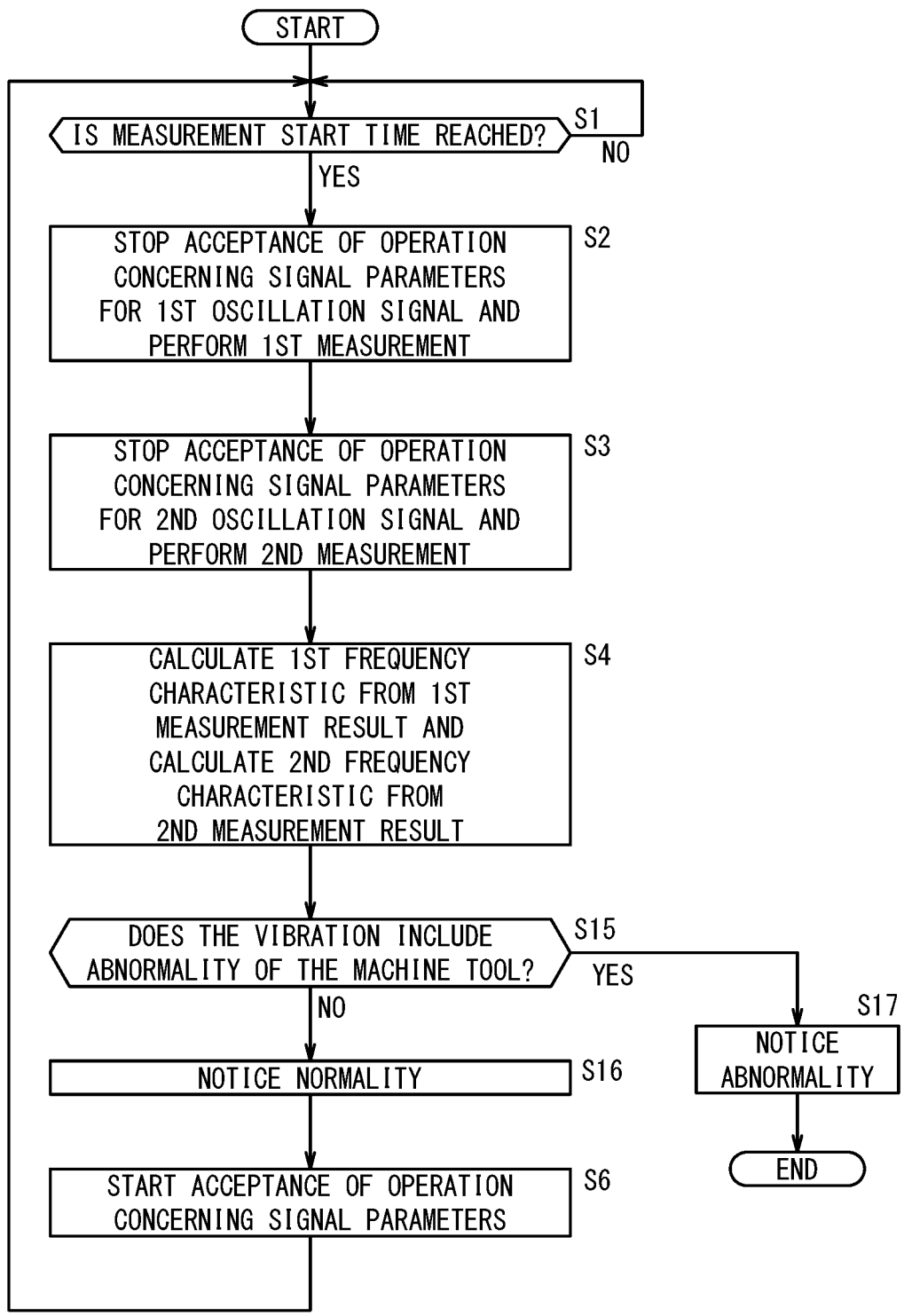

MACHINE TOOL AND VIBRATION DIAGNOSIS SUPPORT METHOD

CROSS-REFERENCE TO RELATED APPLICATION

This application is based upon and claims the benefit of priority from Japanese Patent Application No. 2018-212744 filed on Nov. 13, 2018, the contents of which are incorporated herein by reference.

BACKGROUND OF THE INVENTION

Field of the Invention

The present invention relates to a machine tool having a drive system ranging from a servo motor to a driven target driven by drive force of the servo motor, and also relates to a vibration diagnosis support method for supporting the vibration diagnosis of the machine tool.

Description of the Related Art

In machine tools, in order to grasp the vibration characteristics, the frequency characteristics of a servo motor are sometimes measured. For example, Japanese Laid-Open Patent Publication No. 2016-111897 discloses a servo control device, which calculates frequency characteristics containing the gain between an input signal of sinusoidal waves input to a speed control loop for the servo motor and an output signal output from the speed control loop when the input signal is input thereto, to thereby detect resonance frequencies from the calculated frequency characteristics.

SUMMARY OF THE INVENTION

However, in the servo control device disclosed in Japanese Laid-Open Patent Publication No. 2016-111897, it is difficult to determine whether or not the resonance frequencies detected from the frequency characteristics contains machine tool abnormality such as loose bolts and others.

It is therefore an object of the present invention to provide a machine tool and a vibration diagnosis support method for a machine tool that can detect whether or not the vibration includes abnormality of the machine tool.

A first aspect of this invention is a machine tool including: a drive system ranging from a servo motor to a driven target driven by the drive force of the servo motor; a first signal sending unit configured to send a first oscillation signal, the first oscillation signal being configured to cause the drive shaft of the servo motor to swing periodically and having the oscillation frequency that becomes higher with time; a second signal sending unit configured to send a second oscillation signal, the second oscillation signal being configured to cause the drive shaft to swing periodically and having the oscillation frequency that becomes lower with time; a measurement unit configured to measure a physical quantity representing the state of the machine tool; a first calculator configured to calculate a first frequency characteristic based on a measurement signal of the physical quantity measured by the measurement unit when the drive shaft swings in accordance with the first oscillation signal, and the first oscillation signal; and a second calculator configured to calculate a second frequency characteristic based on a measurement signal of the physical quantity measured by the measurement unit when the drive shaft swings in accordance with the second oscillation signal, and the second oscillation signal.

A second aspect of the present invention provides a vibration diagnosis support method for supporting diagnosis of vibration of a machine tool having a drive system ranging from a servo motor to a driven target driven by the drive force of the servo motor, including: a first measurement step of measuring a physical quantity representing the state of the machine tool when the drive shaft of the servo motor swings in accordance with a first oscillation signal, the first oscillation signal being configured to cause the drive shaft to swing periodically and having the oscillation frequency that becomes higher with time; a second measurement step of measuring the physical quantity when the drive shaft swings in accordance with a second oscillation signal, the second oscillation signal being configured to cause the drive shaft to swing periodically and having the oscillation frequency that becomes lower with time; and a frequency characteristic calculation step of calculating a first frequency characteristic based on the measurement signal of the physical quantity measured at the first measurement step, and the first oscillation signal, and calculating a second frequency characteristic based on the measurement signal of the physical quantity measured at the second measurement step, and the second oscillation signal.

When there is an abnormality in the machine tool, a difference tends to occur between the first frequency characteristic and the second frequency characteristic. Therefore, by calculating the first frequency characteristic and the second frequency characteristic, it is possible to grasp whether a vibration includes an abnormality of the machine tool or not.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a flowchart showing a processing flow in the machine tool in the second embodiment.

DESCRIPTION OF THE PREFERRED EMBODIMENTS

The present invention will be detailed below by describing preferred embodiments with reference to the accompanying drawings.

First Embodiment

Figure 1:
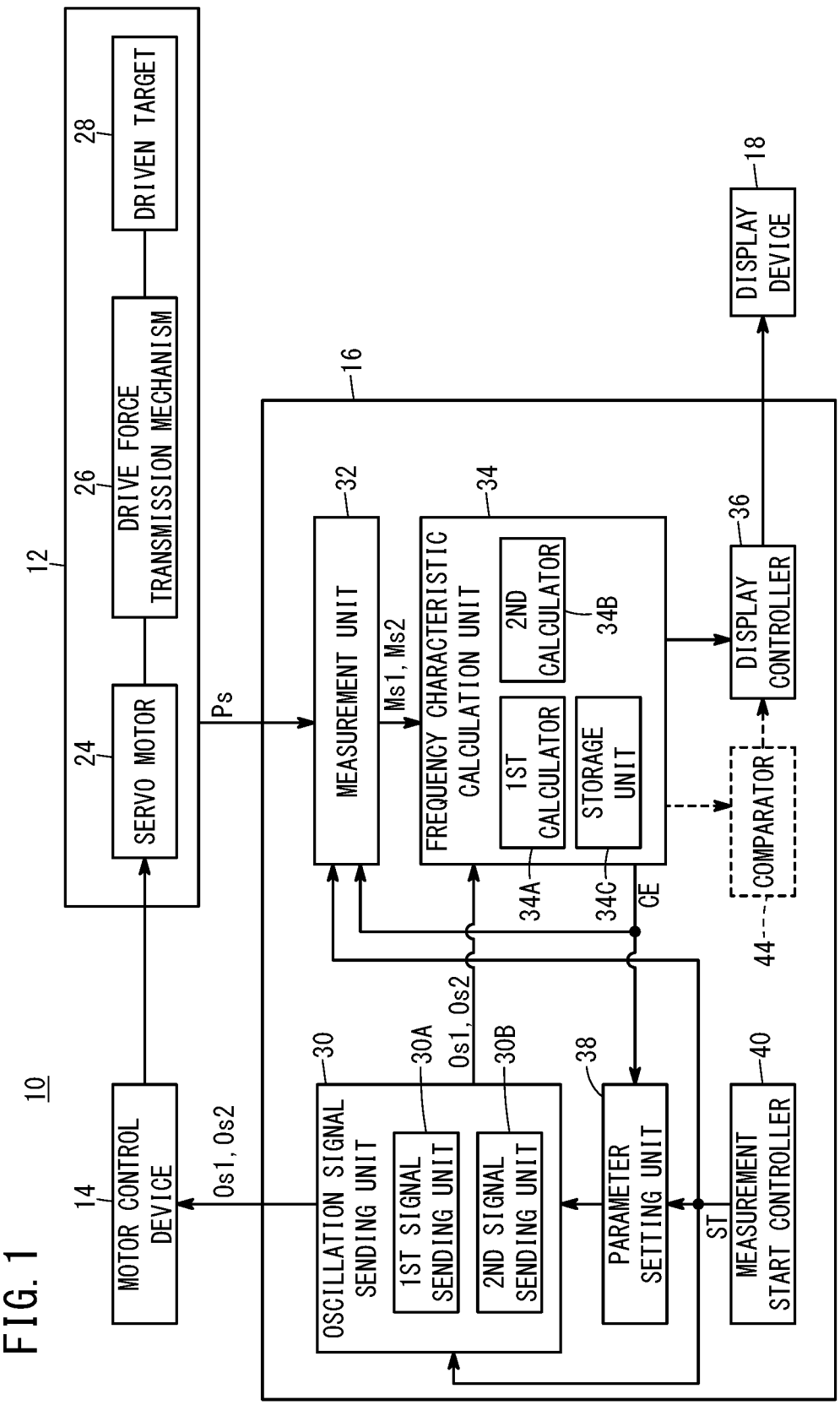
FIG. 1 is a diagram showing a machine tool according to a first embodiment.

FIG. 1 shows a machine tool 10 according to the first embodiment. The machine tool 10 includes a drive system 12, a motor control device 14, a numerical control device 16 and a display device 18.

The drive system 12 includes a servo motor 24, a drive force transmission mechanism 26 that transmits the drive force of the servo motor 24, and a driven target 28 that is driven by the drive force of the servo motor 24 transmitted from the drive force transmission mechanism 26. The servo motor 24 may be a linear motor. The drive force transmission mechanism 26 may be one that converts the rotational force or thrust force of the servo motor 24 into a linear motion and transmits it to the driven target 28, or may be one that directly transmits the rotational force or thrust force of the servo motor 24 to the driven target 28. The drive force transmission mechanism 26 may include ball screws, gears and pulleys. The driven target 28 is a table, a tool or the like. That is, the drive system 12 includes various mechanisms, members, components, etc., from the servo motor 24 to the driven target 28.

The motor control device 14 controls the servo motor 24 in the drive system 12, and the numerical control device 16 controls the motor control device 14 and the display device 18. The display device 18 displays display content on the display screen based on the signal output from the numerical control device 16. Specific examples of the display device 18 include a liquid crystal display or an organic EL display.

As shown in FIG. 1, the numerical control device 16 includes an oscillation signal sending unit 30, a measurement unit 32, a frequency characteristic calculation unit 34, a display controller 36, a parameter setting unit 38 and a measurement start controller 40. The numerical control device 16 includes at least a processor such as a CPU and a storage medium storing a program, and functions as the numerical control device 16 of the present embodiment when the processor executes the program.

The oscillation signal sending unit 30 includes a first signal sending unit 30A and a second signal sending unit 30B. The first signal sending unit 30A sends a first oscillation signal Os1 to the motor control device 14 and the frequency characteristic calculation unit 34. The first oscillation signal Os1 is a command signal that causes the motor control device 14 to repeat a motion (swing) of rotating (moving) the drive shaft by a predetermined angle (displacement) in the positive direction from the current drive shaft position as a reference position, and thereafter rotating (moving) the drive shaft by a predetermined angle (displacement) in the reverse direction. When the first oscillation signal Os1 is sent to the motor control device 14, the motor control device 14 periodically swings the drive shaft of the servo motor 24 in accordance with the first oscillation signal Os1.

Figure 2:
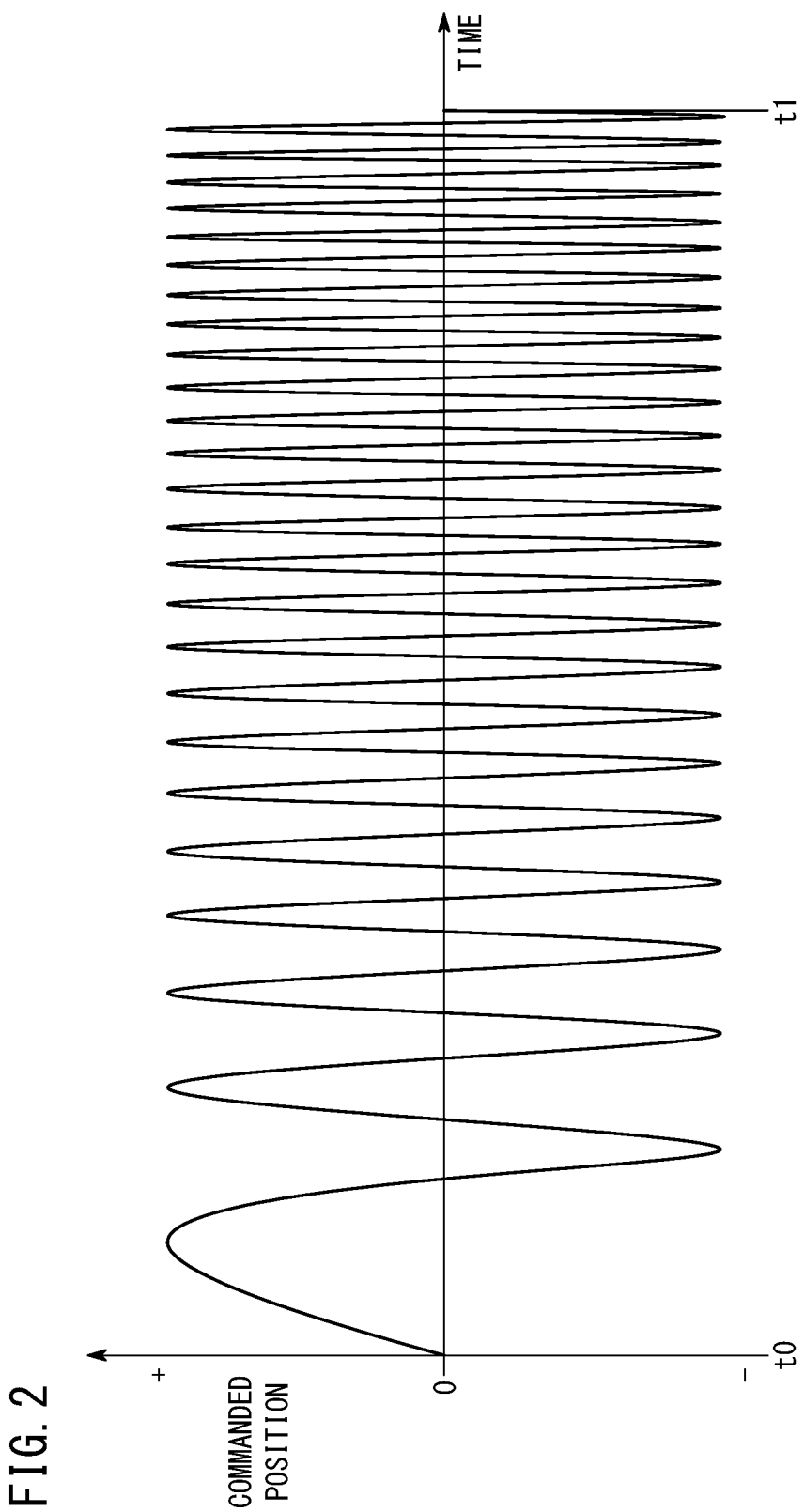
FIG. 2 is a diagram showing an example of a first oscillation signal.

FIG. 2 is a diagram showing an example of the first oscillation signal Os1. As shown in FIG. 2, the value "0" of the first oscillation signal Os1 indicates the reference position. The value of the first oscillation signal Os1 with a plus (+) sign (positive sign) indicates a commanded position of the drive shaft from the reference position to the positive side, and the value of the first oscillation signal Os1 with a minus (−) sign (negative sign) indicates a commanded position of the drive shaft from the reference position to the negative side. The further the commanded position is from the reference position "0", the greater the rotation angle (displacement) of the drive shaft from the reference position becomes.

The oscillation frequency of the first oscillation signal Os1 becomes higher (up-chirps) gradually with time. Therefore, the swing of the drive shaft of the servo motor 24 based on the first oscillation signal Os1 becomes faster with time. In the example shown in FIG. 2, the amplitude of the first oscillation signal Os1 is constant regardless of the passage of time. Therefore, the rotation angle (displacement) by which the drive shaft of the servo motor 24 rotates (displaces) from the reference position to the positive side (i.e., in the positive direction) based on the first oscillation signal Os1 and the rotation angle (displacement) by which the drive shaft rotates (displaces) from the reference position to the opposite side (i.e., in the opposite direction (negative direction)) are the same. The second signal sending unit 30B sends the second oscillation signal Os2 to the motor control device 14 and the frequency characteristic calculation unit 34. The second oscillation signal Os2 is a command signal for controlling the motor control device 14 in the same manner as the first oscillation signal Os1. When the second oscillation signal Os2 is sent to the motor control device 14, the motor control device 14 periodically swings the drive shaft of the servo motor 24 in accordance with the second oscillation signal Os2.

Figure 3:
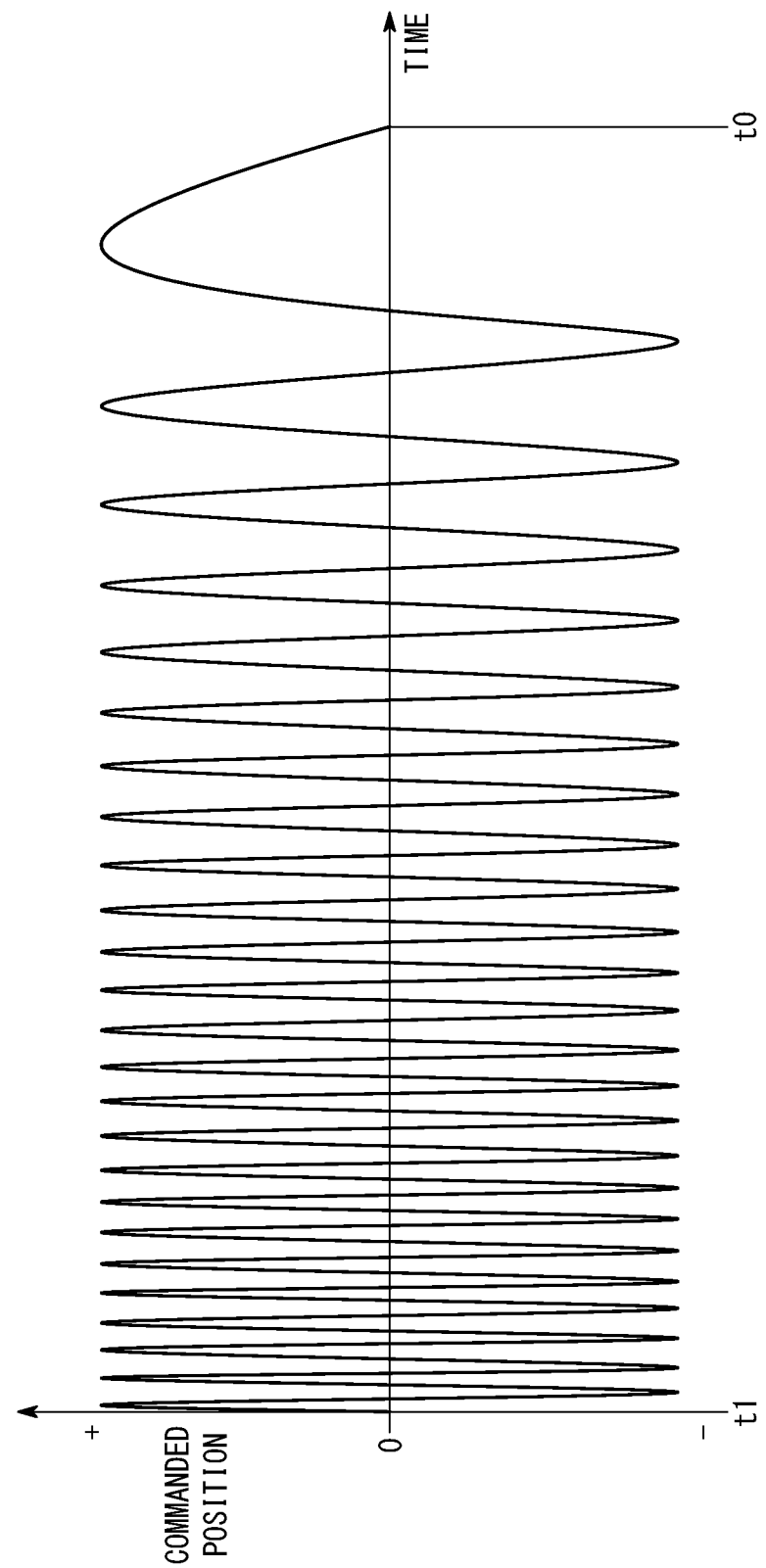
FIG. 3 is a diagram showing an example of a second oscillation signal.

FIG. 3 is a diagram showing an example of the second oscillation signal Os2. As shown in FIG. 3, the value "0" of the second oscillation signal Os2 indicates the reference position. The value of the second oscillation signal Os2 with a plus (+) sign (positive sign) indicates a commanded position of the drive shaft from the reference position to the positive side, and the value of the second oscillation signal Os2 with a minus (−) sign (negative sign) indicates a commanded position of the drive shaft from the reference position to the negative side. The further the commanded position is from the reference position "0", the greater the rotation angle (displacement) of the drive shaft from the reference position becomes.

The oscillation frequency of the second oscillation signal Os2 becomes lower (down-chirps) gradually with time. Therefore, the swing of the drive shaft of the servo motor 24 based on the second oscillation signal Os2 becomes slower as time passes.

As can be seen from the comparison between FIG. 2 and FIG. 3, it is preferable that the second oscillation signal Os2 and the first oscillation signal Os1 have a correspondence relationship between the object and the image as projected on a flat mirror. That is, the second oscillation signal Os2 has a plane-symmetrical correspondence with the first oscillation signal Os1, and is obtained by reversing the time flow (t0 to t1) of the first oscillation signal Os1, i.e., changing to the time flow (t1 to t0). The second oscillation signal Os2 is supplied to the servo motor 24 from t1 to t0.

The measurement unit 32 measures a physical quantity Ps representing the state of the machine tool 10. The examples of the physical quantity Ps include the electric current flowing through the servo motor 24, the torque of the drive shaft, rotation angle (position), speed, acceleration of the servo motor 24 and the like. When measuring the current flowing through the servo motor 24, the measurement unit 32 may use a current sensor. When measuring the torque (thrust) of the drive shaft of the servo motor 24, the measurement unit 32 may be provided with a torque sensor (force sensor). The measurement unit 32 may calculate torque (thrust) from the measured current value. When measuring the rotation angle (position) of the drive shaft of the servo motor 24, the measurement unit 32 may include an encoder that detects the rotation angle (position). The measurement unit 32 may calculate the speed and acceleration from the rotation angle (position).

Note that the measurement unit 32 may measure an electrical signal that is proportional to the torque, position, speed, acceleration, or sound pressure of the drive force transmission mechanism 26 or the driven target 28 as the physical quantity Ps. This is because the physical quantity Ps of the drive force transmission mechanism 26 and the driven target 28 also can indicate the state of the servo motor 24. Accordingly, the measurement unit 32 is provided in the numerical control device 16 in the example shown in FIG. 1, but may be provided in the drive system 12, or in the servo motor 24, or in the motor control device 14. In short, the measurement unit 32 may measure any of kind of physical quantity Ps as long as it represents the status of the machine tool 10. In the present embodiment, the measurement unit 32 is configured to measure the rotation angle (position) of the drive shaft of the servo motor 24 as the physical quantity Ps.

A measurement signal Ms1 indicating the physical quantity Ps (rotation angle (position)) measured by the measurement unit 32 when the drive shaft of the servo motor 24 swings according to the first oscillation signal Os1 varies periodically based on the first oscillation signal Os1. A measurement signal Ms2 indicating the physical quantity Ps (rotation angle (position)) measured by the measurement unit 32 when the drive shaft of the servo motor 24 swings according to the second oscillation signal Os2 varies periodically based on the second oscillation signal Os2. The measurement signals Ms1 and Ms2 measured by the measurement unit 32 are output to the frequency characteristic calculation unit 34.

The frequency characteristic calculation unit 34 includes a first calculator 34A, a second calculator 34B and a storage unit 34C. The first calculator 34A stores the first oscillation signal Os1 sent from the first signal sending unit 30A and the measurement signal Ms1 measured at measurement unit 32 when the servo motor 24 swings according to the first oscillation signal Os1, into the storage unit 34C. The first calculator 34A calculates the first frequency characteristic based on the first oscillation signal Os1 and the measurement signal Ms1 stored in the storage unit 34C.

As the first frequency characteristic, a frequency characteristic related to a physical quantity indicating the magnitude of vibration such as a gain characteristic, is used. In the present embodiment, the first frequency characteristic is a gain characteristic that is an amplitude ratio between the first oscillation signal Os1 and the measurement signal Ms1 at each of multiple oscillation frequencies.

That is, the first calculator 34A calculates, as the first frequency characteristic, the amplitude ratio between the input signal (first oscillation signal Os1) input to the servo motor 24 and the output signal (measurement signal Ms1) output from servo motor 24 in response with the input signal for each oscillation frequency. The first calculator 34A completes calculation of the first frequency characteristic (gain characteristic), and then outputs the calculated first frequency characteristic to the display device 18.

The second calculator 34B stores the second oscillation signal Os2 sent from the second signal sending unit 30B and the measurement signal Ms2 measured at measurement unit 32 when the servo motor 24 swings according to the second oscillation signal Os2, into the storage unit 34C. The second calculator 34B calculates the second frequency characteristic based on the second oscillation signal Os2 and the measurement signal Ms2 stored in the storage unit 34C.

As the second frequency characteristic, one corresponding to the first frequency characteristic is adopted. In this embodiment, since the gain characteristic is used for the first frequency characteristic, the gain characteristic is also adopted as the second frequency characteristic.

That is, the second calculator 34B calculates, as the second frequency characteristic, the amplitude ratio between the input signal (second oscillation signal Os2) input to the servo motor 24 and the output signal (measurement signal Ms2) output from servo motor 24 in response with the input signal for each oscillation frequency. The second calculator 34B completes calculation of the second frequency characteristic (gain characteristic), and then outputs the calculated second frequency characteristic to the display device 18.

When the calculation of both the first frequency characteristic and the second frequency characteristic is completed, the frequency characteristic calculation unit 34 generates a calculation end signal CE, and outputs the calculation end signal CE to the measurement unit 32 and the parameter setting unit 38.

The display controller 36 displays the first frequency characteristic output from the first calculator 34A and the second frequency characteristic output from the second calculator 34B on the display device 18 in a comparative manner.

Figure 4:
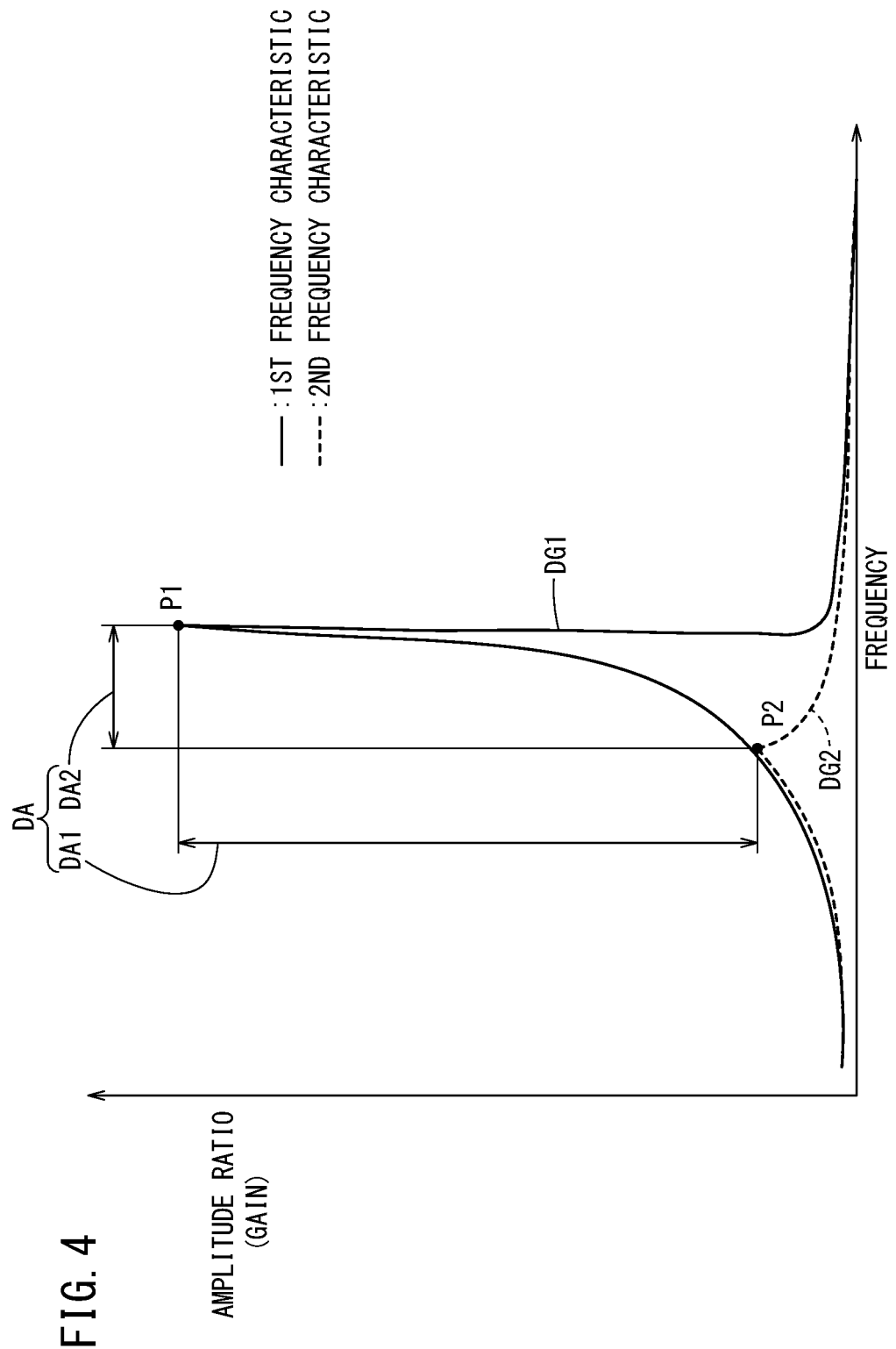
FIG. 4 is a diagram showing a display example of a first frequency characteristic (gain characteristic) and a second frequency characteristic (gain characteristic)

FIG. 4 is a diagram showing a display example of the first frequency characteristic (gain characteristic) and the second frequency characteristic (gain characteristic). As shown in FIG. 4, the display screen of the display device 18 displays a gain diagram DG1 indicating the first frequency characteristic (gain characteristic) and a gain diagram DG2 indicating the second frequency characteristic (gain characteristic). The gain diagrams DG1 and DG2 include gain waveforms in which gains are plotted for each oscillation frequency.

Here, when there is no abnormality in the machine tool 10, the first frequency characteristic (gain characteristic) and the second frequency characteristic (gain characteristic) approximately coincide with each other within tolerance. However, if, for example, the machine tool 10 has an abnormality such as a loose bolt for supporting a member constituting the servo motor 24 or the drive force transmission mechanism 26, a difference tends to occur between the first frequency characteristic (gain characteristic) and the second frequency characteristic (gain characteristic).

This is because, when there is an abnormality in the machine tool 10, different vibrations are likely to occur in the machine tool 10 between the case where the drive shaft is swung such that the oscillation frequency becomes higher gradually with time and the case where the drive shaft is swung such that the oscillation frequency becomes lower gradually with time. The "abnormality" in this case occurs noticeably particularly when there is a type of abnormality called "backlash element", that is, "dead zone element" in terms of control theory, such as mechanical backlash (rattling) or some looseness of fasteners.

Specifically, as shown in FIG. 4, when there is an abnormality in the machine tool 10, the deviation, designated by DA, between a first resonance point P1 appearing in the first frequency characteristic (gain characteristic) and a second resonance point P2 appearing in the second frequency characteristic, correspondingly to the first resonance point P1, becomes greater than a predetermined threshold.

Here, the deviation DA between the first resonance point P1 and the second resonance point P2 indicates at least one of the deviation amount DA1 of the maximum amplitude ratio and the deviation amount DA2 of the resonance frequency. The deviation amount DA1 of the maximum amplitude ratio is a deviation between the maximum amplitude ratio in the first frequency characteristic and the maximum amplitude ratio in the second frequency characteristic. The resonance frequency deviation amount DA2 is a deviation between the frequency at which the amplitude ratio becomes maximum in the first frequency characteristic and the frequency at which the amplitude ratio becomes maximum in the second frequency characteristic.

Therefore, by comparing on the display device 18 the resonance point P1 of the first frequency characteristic (gain characteristic) with the resonance point P2 of the second frequency characteristic (gain characteristic), the operator can find out whether or not the vibration contains an abnormality of the machine tool 10.

When the resonance point P1 and the resonance point P2 are substantially equal, it can be estimated that there is merely a low-rigidity element that is free from backlash or looseness, or that electrical noise is likely to be present. More specifically, occurrence of electrical noise can be estimated when the gain waveforms of the gain diagrams DG1 and DG2 have a narrower shape having a narrow base or a linear shape rising up sharply almost without a base. On the other hand, in a case of a mere low-rigidity element having no backlash, the rises of the gain diagrams DG1 and DG2 tend to have a broad base shape and have a certain width in contrast to the electrical noise. Thanks to these differences, the distinction between the two can be substantially determined.

The parameter setting unit 38 sets at least one of a plurality of signal parameters in each of the first oscillation signal Os1 and the second oscillation signal Os2 based on operation performed by the operator. The multiple signal parameters include the frequency band (frequency range) within which the oscillation frequency is changed, the number of steps when the oscillation frequency is changed gradually within the frequency band, and the value (period) of the oscillation frequency at each step and the amplitude.

When the signal parameters are set by the parameter setting unit 38, the first signal sending unit 30A generates the first oscillation signal Os1 so as to satisfy the designated signal parameters, and sends out the generated first oscillation signal Os1. Similarly, the second signal sending unit 30B generates the second oscillation signal Os2 so as to satisfy the signal parameters designated by the parameter setting unit 38, and sends out the generated second oscillation signal Os2.

Therefore, the operator confirms the first frequency characteristic (gain characteristic) and the second frequency characteristic (gain characteristic) displayed on the display device 18, and then modifies necessary signal parameters among the multiple signal parameters so as to measure gain characteristics again with the modified settings.

Note that, when a frequency is input by an operator's operation, the parameter setting unit 38 may set up a frequency band that includes the input frequency and is narrower than the preset initial frequency band and a greater number of steps than the preset initial value. In this case, if the operator inputs the frequencies of the first resonance point P1 and the second resonance point P2 having a relatively large deviation DA, it is possible to measure more detailed gain characteristics of a range in which the vibration derived from the abnormality of the machine tool 10 is likely to be present and offer the measurement result to the operator.

The measurement start controller 40 manages the measurement start timing. The measurement start controller 40 transmits a measurement start signal ST to the oscillation signal sending unit 30, the measurement unit 32, and the parameter setting unit 38 at a time when it reaches a measurement start time.

When the operator performs an operation to start measurement, the measurement start controller 40 may determine that the measurement start time is reached, and send the measurement start signal ST to the oscillation signal sending unit 30, the measurement unit 32 and the parameter setting unit 38. Alternatively, the measurement start controller 40 may periodically transmit the measurement start signal ST to the oscillation signal sending unit 30, the measurement unit 32 and the parameter setting unit 38.

On receiving the measurement start signal ST, the oscillation signal sending unit 30 sends the first oscillation signal Os1 from the first signal sending unit 30A to the motor control device 14, and then sends the second oscillation signal Os2 to the motor control device 14 from the second signal sending unit 30B after completion of sending of the first oscillation signal Os1. It should be noted that the oscillation signal sending unit 30 may send the second oscillation signal Os2 from the second signal sending unit 30B to the motor control device 14, and then send the first oscillation signal Os1 to the motor control device 14 from the first signal sending unit 30A after completion of sending of the second oscillation signal Os2.

When receiving the measurement start signal ST, the measurement unit 32 measures the physical quantity Ps (rotation angle (position)) of the servo motor 24 until it receives a calculation end signal CE from the frequency characteristic calculation unit 34 (during the measurement period).

Once the parameter setting unit 38 receives the measurement start signal ST, the parameter setting unit 38 prohibits acceptance of operator's operation concerning signal parameters (i.e., sets a prohibition period) until it receives the calculation end signal CE from the frequency characteristic calculation unit 34 (during the measurement period). As a result, it is possible to prevent the deviation DA between the first resonance point P1 and the second resonance point P2 from exceeding the threshold due to the operator' input of the signal parameters during the measurement period.

Figure 5:
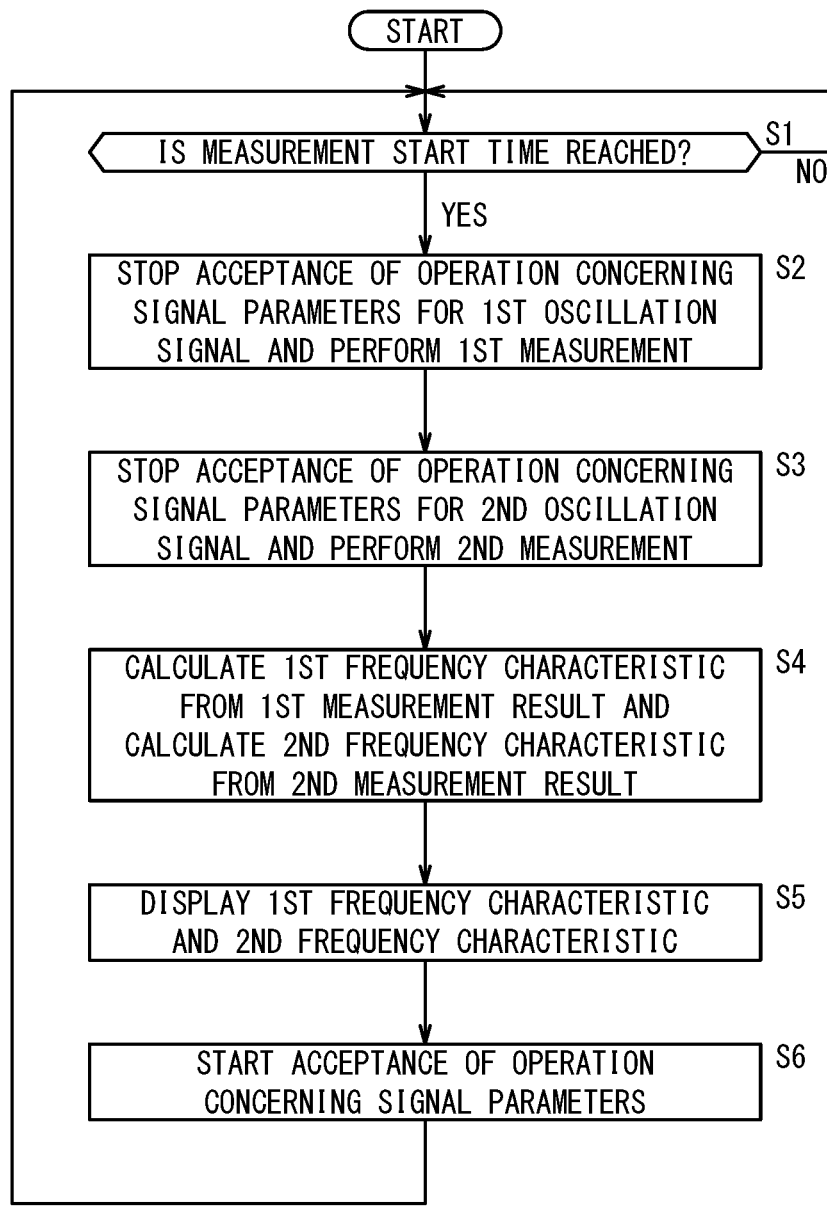
FIG. 5 is a flowchart illustrating a processing flow in the machine tool in the first embodiment.

Next, a brief description will be made on the vibration diagnosis support method for supporting the diagnosis of vibration of the machine tool 10 according to the present embodiment. FIG. 5 is a flowchart showing the processing flow of the machine tool 10 in the first embodiment.

At step S1, the measurement start controller 40 determines whether or not the measurement start time is reached. When the measurement start controller 40 determines that the measurement start timing has not yet been reached, the control returns to step S1. On the other hand, when the measurement start controller 40 determines that the measurement start time is reached, the measurement start controller 40 transmits the measurement start signal ST to the oscillation signal sending unit 30, the measurement unit 32 and the parameter setting unit 38, and the control proceeds to step S2.

At step S2, the oscillation signal sending unit 30 sends the first oscillation signal Os1 to the motor control device 14 and the frequency characteristic calculation unit 34. The measurement unit 32 measures the physical quantity Ps (rotation angle (position)) of the servo motor 24 when the drive shaft of the servo motor 24 swings based on the first oscillation signal Os1. The parameter setting unit 38 stops accepting operation concerning signal parameters for the first oscillation signal Os1 until receiving the calculation end signal CE from the frequency characteristic calculation unit 34, and the control proceeds to step S3.

At step S3, the oscillation signal sending unit 30 sends the second oscillation signal Os2 to the motor control device 14 and the frequency characteristic calculation unit 34. The measurement unit 32 measures the physical quantity Ps (rotation angle (position)) of the servo motor 24 when the drive shaft of the servo motor 24 swings based on the second oscillation signal Os2. The parameter setting unit 38 stops receiving operation concerning the signal parameters for the second oscillation signal Os2 until receiving the calculation end signal CE from the frequency characteristic calculation unit 34, and the control proceeds to step S4.

At step S4, the frequency characteristic calculation unit 34 calculates the first frequency characteristic (gain characteristic), based on the first oscillation signal Os1 sent out at step S2 and the measurement signal Ms1 of the physical quantity Ps (rotation angle (position)) measured at step S2. Further, the frequency characteristic calculation unit 34 calculates the second frequency characteristic (gain characteristic), based on the second oscillation signal Os2 transmitted at step S3 and the measurement signal Ms2 of the physical quantity Ps (rotation angle (position)) measured at step S3. After completing the calculation of the first frequency characteristic (gain characteristic) and the second frequency characteristic (gain characteristic), the frequency characteristic calculation unit 34 outputs the calculation end signal CE to the measurement unit 32 and the parameter setting unit 38. Then, the control proceeds to step S5.

At step S5, the display controller 36 causes the display device 18 to display the first frequency characteristic (gain characteristic) and the second frequency characteristic (gain characteristic) calculated at step S4, and then the control proceeds to step S6.

At step S6, when receiving the calculation end signal CE from the frequency characteristic calculation unit 34, the parameter setting unit 38 starts accepting operation concerning signal parameters for each of the first oscillation signal Os1 and the second oscillation signal Os2. Then, the control returns to step S1.

Note that when operation concerning the signal parameters has been performed from the start of acceptance of the operation concerning signal parameters until the reception of the measurement start signal ST, the parameter setting unit 38 sets the value of the signal parameter, for which the operation has been performed, at the input value input by the operator. In this case, when the oscillation signal sending unit 30 generates the first oscillation signal Os1 and the second oscillation signal Os2 so as to satisfy the set signal parameters and thereafter receives the measurement start signal ST, the oscillation signal sending unit 30 then sends out the generated first oscillation signal Os1 and second oscillation signal Os2.

In the example shown in FIG. 5, the process of step S3 is executed after the process of step S2, but the process of step S2 may be executed after the process of step S3.

The above first embodiment can be modified as follows.

Modification 1-1

The numerical control device 16 according to the first embodiment may be provided with a comparator 44 as indicated by a dashed line in FIG. 1. The comparator 44 compares the deviation DA between the first resonance point P1 (FIG. 4) appearing in the first frequency characteristic (gain characteristic) and the second resonance point P2 (FIG. 4) appearing in the second frequency characteristic corresponding to the first resonance point P1, with a predetermined threshold value. As described above, the deviation DA between the first resonance point P1 and the second resonance point P2 is at least one of the deviation amount DA1 of the maximum amplitude ratio and the deviation amount DA2 of the resonance frequency.

Here, when at least one of the deviation amount DA1 of the maximum amplitude ratio and the deviation amount DA2 of the resonance frequency is greater than or equal to a predetermined threshold, the comparator 44 outputs the first resonance point P1 (see FIG. 4) and the second resonance point P2 (FIG. 4) for which the deviation is greater than the threshold, to the display controller 36.

The display controller 36 causes the display device 18 to display the first resonance point P1 and the second resonance point P2 output from the comparator 44 in a distinctive manner (i.e., so as to be distinguishable from each other), together with the first frequency characteristic and the second frequency characteristic calculated by the frequency characteristic calculation unit 34. This configuration enables the operator to intuitively and easily acquire information that there is a high possibility that a vibration including an abnormality of the machine tool 10 is occurring.

As a specific mode of distinctive display, for example, the display controller 36 may select the waveform portions including the resonance points P1 and P2 at which the deviation DA is equal to or greater than the threshold from among the gain waveforms in the gain diagrams DG1 and DG2 (FIG. 4) and display those portions with emphasis over the other waveform portions. Further, for example, the display controller 36 may display the gain diagrams DG1 and DG2 (FIG. 4) on the same screen in an overlapped manner with different colors. Moreover, for example, the display controller 36 may display the gain waveform of the first frequency characteristic and the gain waveform of the second frequency characteristic on the same scale graph every unit time or in accordance with the switching operation of the operator.

Modification 1-2

In Modification 1-1, the comparator 44 outputs the first resonance point P1 and the second resonance point P2 at which the deviation DA between the first resonance point P1 and the second resonance point P2 is equal to or greater than a predetermined threshold, to the display controller 36. On the other hand, in Modification 1-2, the comparator 44 generates a comment related to the vibration in accordance with the deviation DA between the first resonance point P1 and the second resonance point P2, and outputs the generated comment to the display controller 36.

For example, when the deviation DA between the first resonance point P1 and the second resonance point P2 is equal to or greater than the predetermined threshold, the comparator 44 generates a comment that there is a possibility of vibration including an abnormality of the machine tool 10, and outputs the generated comment to the display controller 36. In this case, the display controller 36 causes the display device 18 to display the comment that there is a possibility of vibration including an abnormality of the machine tool 10, together with the first frequency characteristic and the second frequency characteristic calculated by the frequency characteristic calculation unit 34.

On the other hand, when the deviation DA between the first resonance point P1 and the second resonance point P2 is less than the predetermined threshold, the comparator 44 generates a comment that there is a high possibility of no factor being found to cause abnormality in the machine tool 10, and outputs the generated comment to the display controller 36. In this case, the display controller 36 causes the display device 18 to display the comment that there is a high possibility that the machine tool 10 is highly likely to have no factor that is considered abnormal, together with the first frequency characteristic and the second frequency characteristic calculated by the frequency characteristic calculation unit 34.

As described above, when the display controller 36 displays a comment regarding vibration depending on the deviation DA between the first resonance point P1 and the second resonance point P2, it is possible to give the operator information about whether or not there is a vibration including abnormality of the machine tool 10 in a manner that the operator can intuitively and easily understand the information.

Second Embodiment

Figure 6:
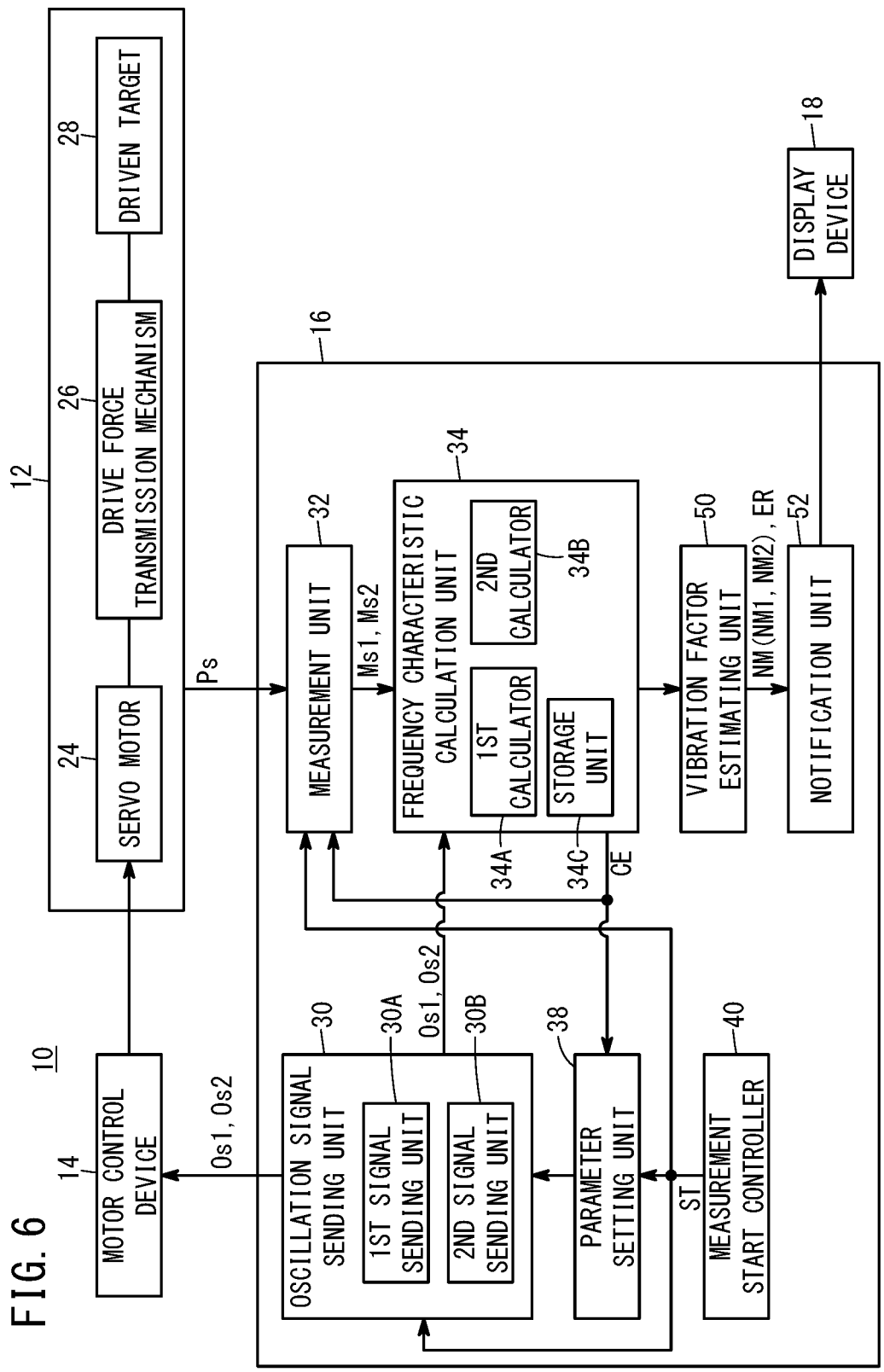
FIG. 6 is a diagram showing a machine tool according to a second embodiment.

FIG. 6 is a diagram showing a machine tool 10 according to the second embodiment. Here, the same components as those described in the first embodiment are allotted with the same reference numerals, and the repeated description as that in the first embodiment is omitted.

In the machine tool 10 of the second embodiment, the configuration of a numerical control device 16 is different from that of the first embodiment. Specifically, in the numerical control device 16 of the present embodiment, neither display controller 36 nor comparator 44 is provided, and a vibration factor estimating unit 50 and a notification unit 52 are added.

The vibration factor estimating unit 50 estimates whether or not the vibration includes an abnormality of the machine tool 10, based on the deviation DA between the first resonance point P1 appearing in the first frequency characteristic (gain characteristic) and the second resonance point P2 appearing in the second frequency characteristic (gain characteristic).

That is, the vibration factor estimating unit 50 detects the maximum amplitude ratio and the resonance frequency in the first frequency characteristic (gain characteristic) output from the first calculator 34A, and detects the maximum amplitude ratio and the resonance frequency in the second frequency characteristic (gain characteristic) output from the second calculator 34B. Based on the detection result, the vibration factor estimating unit 50 recognizes the deviation DA between the first resonance point P1 and the second resonance point P2, and compares the recognized deviation DA with a predetermined threshold.

Here, when the deviation DA between the first resonance point P1 and the second resonance point P2 is less than a predetermined threshold, the vibration factor estimating unit 50 estimates that the vibration does not include abnormality of the machine tool 10 but is within the normal range. In this case, the vibration factor estimating unit 50 generates a normal signal NM and outputs the generated normal signal NM to the notification unit 52.

On the other hand, when the deviation DA between the first resonance point P1 and the second resonance point P2 is equal to or greater than the predetermined threshold, the vibration factor estimating unit 50 estimates that the vibration includes abnormality of the machine tool 10. In this case, the vibration factor estimating unit 50 generates an abnormal signal ER and outputs the generated abnormal signal ER to the notification unit 52.

The notification unit 52 notifies the estimation result of the vibration factor estimating unit 50. That is, when the normal signal NM is given from the vibration factor estimating unit 50, the notification unit 52 notifies the operator that there is a low possibility that vibration including abnormality of the machine tool 10 is occurring. On the other hand, when the abnormal signal ER is given from the vibration factor estimating unit 50, the notification unit 52 notifies the operator that there is a high possibility that a vibration including abnormality of the machine tool 10 is occurring.

Specific notification modes of the notification unit 52 include, for example, a displaying mode on the display device 18, a sound generating mode from an unillustrated sound generator, and a light generating mode from an unillustrated light emitting device. Note that the notification unit 52 may notify information using two or more notification modes.

When the display device 18 is configured to display that there is a high possibility that a vibration including abnormality of the machine tool 10 is occurring, the notification unit 52 may acquire the first frequency characteristic and the second frequency characteristic from the frequency characteristic calculation unit 34 and display the first frequency characteristic and the second frequency characteristic in a comparative manner. In addition, the notification unit 52 may acquire the first resonance point P1 and the second resonance point P2 presenting a deviation DA equal to or greater than a predetermined threshold, from the vibration factor estimating unit 50 and display the first resonance point P1 and the second resonance point P2 in a distinctive manner.

Next, a brief description will be made on the vibration diagnosis support method for supporting the diagnosis of vibration of the machine tool 10 in this embodiment. FIG. 7 is a flowchart showing the processing flow of the machine tool 10 in the second embodiment. Here, the steps equivalent to those described in the first embodiment are allotted with the same step numbers, and the repeated description as that in the first embodiment is omitted.

The vibration diagnosis support method of this embodiment includes steps S15 to S17 instead of step S5 of the first embodiment.

That is, at step S15, the vibration factor estimating unit 50 compares the deviation DA between the first resonance point P1 calculated at step S4, appearing in the first frequency characteristic, and the second resonance point P2 calculated at step S4, appearing in the second resonance characteristic, with the predetermined threshold.

Here, when the deviation DA between the first resonance point P1 and the second resonance point P2 is less than the predetermined threshold, the vibration factor estimating unit 50 estimates that the vibration does not include abnormality of the machine tool 10 but is within normal limits. In this case, the vibration factor estimating unit 50 generates a normal signal NM and outputs the generated normal signal NM to the notification unit 52, and the control goes to step S16.

At step S16, when the notification unit 52 receives the normal signal NM, the notification unit 52 notifies the operator that there is a low possibility that vibration including abnormality of the machine tool 10 is occurring. Then the control goes to step S6.

On the other hand, when the deviation DA between the first resonance point P1 and the second resonance point P2 is equal to or greater than the predetermined threshold, the vibration factor estimating unit 50 estimates that the vibration includes an abnormality of the machine tool 10. In this case, the vibration factor estimating unit 50 generates an abnormal signal ER and outputs the generated abnormal signal ER to the notification unit 52. Then the control proceeds to step S17.

At step S17, when receiving the abnormal signal ER, the notification unit 52 notifies the operator that there is a high possibility that a vibration including abnormality of the machine tool 10 is occurring. In this case, the process of the machine tool 10 is ended.

As described above, in the second embodiment, the vibration factor estimating unit 50 of the machine tool 10 estimates whether there is a vibration including abnormality of the machine tool 10, and when it is estimated that there is, the fact is notified and the measurement of the frequency characteristics is stopped.

The above second embodiment can be modified as follows.

Modification 2-1

In Modification 2-1, when it has estimated that a vibration is within normal limits or a normal range (i.e., the deviation DA between the first resonance point P1 and the second resonance point P2 is less than the predetermined threshold), the vibration factor estimating unit 50 additionally estimates whether the vibration is inherent to the machine tool 10 or results from electrical noise.

That is, the vibration factor estimating unit 50 detects a first Q value from the first frequency characteristic (gain characteristic) output from the first calculator 34A, and compares the detected first Q value with a predetermined Q value threshold. Further, the vibration factor estimating unit 50 detects a second Q value from the second frequency characteristic (gain characteristic) output from the second calculator 34B, and compares the detected second Q value with the predetermined Q value threshold.

At this stage, when both the first Q value and the second Q value are less than the predetermined Q value threshold, the vibration factor estimating unit 50 estimates that the vibration is inherent to the machine tool 10. In this case, the vibration factor estimating unit 50 generates a first normal signal NM1 and outputs the generated first normal signal NM1 to the notification unit 52. When receiving the first normal signal NM1, the notification unit 52 notifies the operator that there is a high possibility that neither a vibration including abnormality of the machine tool 10 nor electrical noise is occurring.

On the other hand, when at least one of the first Q value and the second Q value is equal to or greater than the predetermined Q value threshold, the vibration factor estimating unit 50 estimates that electrical noise is present. In this case, the vibration factor estimating unit 50 generates a second normal signal NM2, and outputs the generated second normal signal NM2 to the notification unit 52. Upon receiving the second normal signal NM2, the notification unit 52 notifies the operator that there is a high possibility that no vibration including abnormality of the machine tool 10 is occurring, but there is a high possibility that electrical noise is present.

As described above, according to Modification 2-1, it is possible to grasp in more detail the vibration factor when there is a high possibility that the vibration does not include the abnormality of the machine tool 10.

Modification 2-2

In the second embodiment, the frequency characteristic calculation unit 34, the vibration factor estimating unit 50, and the notification unit 52 are provided in the numerical control device 16. However, at least one of the frequency characteristic calculation unit 34, the vibration factor estimating unit 50 and the notification unit 52 may be provided in a PC (personal computer) or the like that is connected to the numerical control device 16 in a communicable manner. Similarly, in the first embodiment, at least one of the frequency characteristic calculation unit 34, the display controller 36 and the comparator 44 may be provided in a PC or the like that is connected to the numerical control device 16 in a communicable manner.

Common Modifications

In the first and second embodiments, the machine tool 10 is provided with one drive system 12 for one axis. However, the machine tool 10 may be provided with multiple drive systems 12 for multiple axes, such as one drive system 12 for the X-axis, one drive system 12 for the Y-axis and one drive system 12 for the Z-axis.

When multiple drive systems 12 are provided in the machine tool 10, the numerical control device 16 may be provided in common for the multiple drive systems 12, or one numerical control device may be provided for each of the multiple drive systems 12. Further, when the multiple drive systems 12 are provided in the machine tool 10, for each of the servo motors 24 included in the respective multiple drive systems 12, the first frequency characteristics (gain characteristics) and the second frequency characteristics (gain characteristics) are acquired.

When the first frequency characteristic (gain characteristic) and the second frequency characteristic (gain characteristic) are acquired for each of the servo motors 24 of the multiple drive systems 12, it is possible to detect the presence of vibration abnormality in the machine tool 10 in more detail. Further, in this case, the abnormality of the machine tool 10 can be clearly revealed using the gain characteristics obtained at the axis closest to the abnormal site.

Technical Ideas Obtained from the Embodiments

The technical ideas that can be grasped from the first embodiment and the second embodiment will be described below.

First Technical Idea

The machine tool (10) includes a drive system (12), a first signal sending unit (30A), a second signal sending unit (30B), a measurement unit (32), a first calculator (34A), and a second calculator (34B). The drive system (12) is a drive system that ranges from a servo motor (24) to a driven target (28) driven by the drive force of the servo motor (24). The first signal sending unit (30A) sends a first oscillation signal (Os1), the first oscillation signal being configured to cause the drive shaft of the servo motor (24) to swing periodically and having the oscillation frequency that becomes higher with time. The second signal sending unit (30B) sends a second oscillation signal (Os2), the second oscillation signal being configured to cause the drive shaft to swing periodically and having the oscillation frequency that becomes lower with time. The measurement unit (32) measures a physical quantity (Ps) representing the state of the machine tool (10). The first calculator (34A) calculates a first frequency characteristic based on a measurement signal (Ms1) of the physical quantity (Ps) measured by the measurement unit (32) when the drive shaft swings in accordance with the first oscillation signal (Os1), and the first oscillation signal (Os1). The second calculator (34B) calculates a second frequency characteristic, based on a measurement signal (Ms2) of the physical quantity (Ps) measured by the measurement unit (32) when the drive shaft swings in accordance with the second oscillation signal (Os2), and the second oscillation signal (Os2).

When there is an abnormality in the machine tool (10), a difference tends to occur between the first frequency characteristic and the second frequency characteristic. Therefore, by calculating the first frequency characteristic and the second frequency characteristic, it is possible to grasp whether a vibration contains an abnormality of the machine tool (10) or not.

The machine tool (10) may further include a display controller (36) for causing a display device (18) to display the first frequency characteristic and the second frequency characteristic in a comparative manner. This configuration can present information on whether or not a vibration contains an abnormality of the machine tool (10), to the operator.

The display controller (36) may be configured to cause the display device (18) to display, in a distinctive manner, a first resonance point (P1) appearing in the first frequency characteristic and a second resonance point (P2) appearing in the second frequency characteristic corresponding to the first resonance point (P1) when the deviation (DA) between the first resonance point (P1) and the second resonance point (P2) is equal to or greater than a predetermined threshold. With this configuration, it is possible to present, to the operator, information that there is a high possibility that a vibration including abnormality of the machine tool (10) is occurring, intuitively and in an easy-to-understand manner.

The display controller (36) may be configured to cause the display device (18) to display a comment relating to vibration in accordance with the deviation (DA) between a first resonance point (P1) appearing in the first frequency characteristic and a second resonance point (P2) appearing in the second frequency characteristic corresponding to the first resonance point (P1). With this configuration, it is possible to give the operator information on whether a vibration contains abnormality of the machine tool (10), intuitively and in an easy-to-understand manner.

The machine tool (10) may further include a parameter setting unit (38) for setting at least one signal parameter selected among the frequency band within which the oscillation frequency is changed for each of the first oscillation signal (Os1) and the second oscillation signal (Os2), the number of steps by which the oscillation frequency is changed gradually within the frequency band, and the amplitude of each of the first oscillation signal (Os1) and the second oscillation signal (Os2), based on operation performed by the operator. In this configuration, the first signal sending unit (30A) may be configured to send the first oscillation signal (Os1) so as to satisfy the signal parameter set by the parameter setting unit (38), and the second signal sending unit (30B) may be configured to send the second oscillation signal (Os2) so as to satisfy the signal parameter set by the parameter setting unit (38). With this configuration, the operator can confirm the first frequency characteristic and the second frequency characteristic displayed on the display device (18) and set desired signal parameters from among the multiple signal parameters, to thereby measure the frequency characteristics again in accordance with the modified settings.

The parameter setting unit (38) may be configured to set the frequency band so that the frequency band contains the frequency input by the operator and is narrower than the preset initial frequency band, and set the number of steps that is greater than the preset initial number. This configuration makes it possible to measure in more detail the frequency characteristics in a frequency range within which a vibration containing an abnormality of the machine tool (10) is more likely to be occurring, and present the measurement result to the operator.

The machine tool (10) may further include: a vibration factor estimating unit (50) for estimating whether or not a vibration contains an abnormality of the machine tool (10), based on the deviation (DA) between the first resonance point (P1) appearing in the first frequency characteristic and the second resonance point (P2) appearing in the second frequency characteristic corresponding to the first resonance point (P1); and a notification unit (52) for notifying the estimation result of the vibration factor estimating unit (50). Owing thereto, it is possible to present information that there is a vibration including abnormality of the machine tool (10), to the operator.

The vibration factor estimating unit (50) may be configured to estimate that there is a high possibility that a vibration including an abnormality of the machine tool (10) is occurring when the deviation (DA) is equal to or greater than a predetermined threshold and estimate that there is a low possibility that a vibration including an abnormality of the machine tool (10) is occurring when the deviation (DA) is less than the predetermined threshold. With this configuration, it becomes easy to enhance the accuracy of estimation.

The vibration factor estimating unit (50) may be configured to compare a first Q value obtained based on the first frequency characteristic and a second Q value obtained based on the second frequency characteristic with a predetermined Q value threshold when the deviation (DA) is less than the predetermined threshold, and also configured to estimate that there is a high possibility that a vibration inherent to the machine tool (10) is occurring when both the first Q value and the second Q value are less than the predetermined Q value threshold and estimate that there is a high possibility of electrical noise occurring when at least one of the first Q value and the second Q value is equal to or greater than the predetermined Q value threshold. This configuration makes it possible to grasp in more detail a vibration factor when there is a high possibility that no vibration including abnormality of the machine tool (10) is occurring.

Second Technical Idea

A vibration diagnosis support method supports diagnosis of vibration of a machine tool (10) having a drive system (12) ranging from a servo motor (24) to a driven target (28) driven by the drive force of the servo motor (24). This vibration diagnosis support method includes a first measurement step (S2), a second measurement step (S3) and a frequency characteristic calculation step (S4). The first measurement step (S2) measures a physical quantity (Ps) representing the state of the machine tool (10) when the drive shaft of the servo motor (24) swings in accordance with a first oscillation signal (Os1), the first oscillation signal being configured to cause the drive shaft to swing periodically and having the oscillation frequency that becomes higher with time. The second measurement step (S3) measures the physical quantity (Ps) when the drive shaft swings in accordance with a second oscillation signal (Os2), the second oscillation signal being configured to cause the drive shaft to swing periodically and having the oscillation frequency that becomes lower with time. The frequency characteristic calculation step (S4) calculates a first frequency characteristic based on the measurement signal (Ms1) of the physical quantity (Ps) measured at the first measurement step (S2), and the first oscillation signal (Os1), and calculates a second frequency characteristic based on the measurement signal (Ms2) of the physical quantity (Ps) measured at the second measurement step (S3), and the second oscillation signal (Os2).

When there is an abnormality in the machine tool (10), a difference tends to occur between the first frequency characteristic and the second frequency characteristic. Therefore, by calculating the first frequency characteristic and the second frequency characteristic, it is possible to grasp whether a vibration includes an abnormality of the machine tool (10) or not.

The vibration diagnosis support method may further include a display step (S5) of causing a display device (18) to display the first frequency characteristic and the second frequency characteristic in a comparative manner. This configuration can present information on whether or not a vibration includes an abnormality of the machine tool (10), to the operator.

The display step (S5) may cause the display device (18) to display, in a distinctive manner, a first resonance point (P1) appearing in the first frequency characteristic and a second resonance point (P2) appearing in the second frequency characteristic corresponding to the first resonance point (P1) when the deviation (DA) between the first resonance point (P1) and the second resonance point (P2) is equal to or greater than a predetermined threshold. With this configuration, it is possible to present, to the operator, information that there is a high possibility that a vibration including abnormality of the machine tool (10) is occurring, intuitively and in an easy-to-understand manner.

The display step (S5) may cause the display device (18) to display a comment relating to vibration in accordance with the deviation (DA) between a first resonance point (P1) appearing in the first frequency characteristic and a second resonance point (P2) appearing in the second frequency characteristic corresponding to the first resonance point (P1). With this configuration, it is possible to present the operator with intuitive and easy-to-understand information on whether a vibration contains abnormality of the machine tool (10).

The vibration diagnosis support method may further include: a vibration factor estimation step (S15) of estimating whether or not a vibration includes an abnormality of the machine tool (10), based on the deviation (DA) between the first resonance point (P1) appearing in the first frequency characteristic and the second resonance point (P2) appearing in the second frequency characteristic corresponding to the first resonance point (P1); and a notification step (S16, S17) of notifying the estimation result at the vibration factor estimation step (S15). Owing thereto, it is possible to present information that there is a vibration including abnormality of the machine tool (10), to the operator.

The vibration factor estimation step (S15) may estimate that there is a vibration including an abnormality of the machine tool (10) when the deviation (DA) is equal to or greater than a predetermined threshold and estimate that there is no vibration including an abnormality of the machine tool (10) when the deviation (DA) is less than the predetermined threshold. With this configuration, it becomes easy to enhance the accuracy of estimation.

The vibration factor estimation step (S15) may compare a first Q value obtained based on the first frequency characteristic and a second Q value obtained based on the second frequency characteristic with a predetermined Q value threshold when the deviation (DA) is less than the predetermined threshold, estimate that there is a high possibility that a vibration inherent to the machine tool (10) is occurring when both the first Q value and the second Q value are less than the predetermined Q value threshold and estimate that there is a high possibility of electrical noise occurring when at least one of the first Q value and the second Q value is equal to or greater than the predetermined Q value threshold. This configuration makes it possible to grasp in more detail a vibration factor when there is a high possibility that no vibration including abnormality of the machine tool (10) is occurring.

The present invention is not particularly limited to the embodiment described above, and various modifications are possible without departing from the essence and gist of the present invention.

What is claimed is:

1. A machine tool, comprising:
    a drive system ranging from a servo motor to a driven target driven by drive force of the servo motor;
    a first signal sending unit configured to send a first oscillation signal, the first oscillation signal being configured to cause a drive shaft of the servo motor to swing periodically and having an oscillation frequency that becomes higher with time;
    a second signal sending unit configured to send a second oscillation signal, the second oscillation signal being configured to cause the drive shaft to swing periodically and having an oscillation frequency that becomes lower with time;
    a measurement unit configured to measure a physical quantity representing a state of the machine tool;
    a first calculator configured to calculate a first frequency characteristic based on a measurement signal of the physical quantity measured by the measurement unit when the drive shaft swings in accordance with the first oscillation signal, and the first oscillation signal; and
    a second calculator configured to calculate a second frequency characteristic based on a measurement signal of the physical quantity measured by the measurement unit when the drive shaft swings in accordance with the second oscillation signal, and the second oscillation signal.

2. The machine tool according to claim 1, further comprising a display controller configured to cause a display device to display the first frequency characteristic and the second frequency characteristic in a comparative manner.

3. The machine tool according to claim 2, wherein the display controller is configured to cause the display device to display, in a distinctive manner, a first resonance point appearing in the first frequency characteristic and a second resonance point appearing in the second frequency characteristic corresponding to the first resonance point when a deviation between the first resonance point and the second resonance point is equal to or greater than a predetermined threshold.

4. The machine tool according to claim 2, wherein the display controller is configured to cause the display device to display a comment relating to vibration in accordance with a deviation between a first resonance point appearing in the first frequency characteristic and a second resonance point appearing in the second frequency characteristic corresponding to the first resonance point.

5. The machine tool according to claim 1, further comprising a parameter setting unit configured to set at least one signal parameter selected among a frequency band within which the oscillation frequency is changed for each of the first oscillation signal and the second oscillation signal, number of steps by which the oscillation frequency is changed within the frequency band, and an amplitude of each of the first oscillation signal and the second oscillation signal, based on operation performed by an operator, wherein
the first signal sending unit is configured to send the first oscillation signal so as to satisfy the signal parameter set by the parameter setting unit, and the second signal sending unit is configured to send the second oscillation signal so as to satisfy the signal parameter set by the parameter setting unit.

6. The machine tool according to claim 5, wherein the parameter setting unit is configured to set up the frequency band so that the frequency band contains a frequency input by the operator and is narrower than a preset initial frequency band, and set up the number of steps that is greater than a preset initial number.

7. The machine tool according to claim 1, further comprising:
a vibration factor estimating unit configured to estimate whether or not a vibration includes an abnormality of the machine tool, based on a deviation between a first resonance point appearing in the first frequency characteristic and a second resonance point appearing in the second frequency characteristic corresponding to the first resonance point; and
a notification unit configured to notify an estimation result of the vibration factor estimating unit.

8. The machine tool according to claim 7, wherein the vibration factor estimating unit is configured to estimate that there is a high possibility that a vibration including an abnormality of the machine tool is occurring when the deviation is equal to or greater than a predetermined threshold and estimate that there is a low possibility that a vibration including an abnormality of the machine tool is occurring when the deviation is less than the predetermined threshold.

9. The machine tool according to claim 8, wherein the vibration factor estimating unit is configured to compare a first Q value obtained based on the first frequency characteristic and a second Q value obtained based on the second frequency characteristic with a predetermined Q value threshold when the deviation is less than the predetermined threshold, and also configured to estimate that there is a high possibility that a vibration inherent to the machine tool is occurring when both the first Q value and the second Q value are less than the predetermined Q value threshold and estimate that there is a high possibility of electrical noise occurring when at least one of the first Q value and the second Q value is equal to or greater than the predetermined Q value threshold.

10. A vibration diagnosis support method for supporting diagnosis of vibration of a machine tool having a drive system ranging from a servo motor to a driven target driven by drive force of the servo motor, comprising:
a first measurement step of measuring a physical quantity representing a state of the machine tool when a drive shaft of the servo motor swings in accordance with a first oscillation signal, the first oscillation signal being configured to cause the drive shaft to swing periodically and having an oscillation frequency that becomes higher with time;
a second measurement step of measuring the physical quantity when the drive shaft swings in accordance with a second oscillation signal, the second oscillation signal being configured to cause the drive shaft to swing periodically and having an oscillation frequency that becomes lower with time; and
a frequency characteristic calculation step of calculating a first frequency characteristic based on a measurement signal of the physical quantity measured at the first measurement step, and the first oscillation signal, and calculating a second frequency characteristic based on a measurement signal of the physical quantity measured at the second measurement step, and the second oscillation signal.

11. The vibration diagnosis support method according to claim 10, further comprising a display step of causing a display device to display the first frequency characteristic and the second frequency characteristic in a comparative manner.

12. The vibration diagnosis support method according to claim 11, wherein the display step causes the display device to display, in a distinctive manner, a first resonance point appearing in the first frequency characteristic and a second resonance point appearing in the second frequency characteristic corresponding to the first resonance point when a deviation between the first resonance point and the second resonance point is equal to or greater than a predetermined threshold.

13. The vibration diagnosis support method according to claim 11, wherein the display step causes the display device to display a comment relating to vibration in accordance with a deviation between a first resonance point appearing in the first frequency characteristic and a second resonance point appearing in the second frequency characteristic corresponding to the first resonance point.

14. The vibration diagnosis support method according to claim 10, further comprising:
a vibration factor estimation step of estimating whether or not a vibration includes an abnormality of the machine tool, based on a deviation between a first resonance point appearing in the first frequency characteristic and a second resonance point appearing in the second frequency characteristic corresponding to the first resonance point; and
a notification step of notifying an estimation result at the vibration factor estimation step.

15. The vibration diagnosis support method according to claim 14, wherein the vibration factor estimation step estimates that there is a vibration including an abnormality of the machine tool when the deviation is equal to or greater than a predetermined threshold and estimates that there is no vibration including an abnormality of the machine tool when the deviation is less than the predetermined threshold.

16. The vibration diagnosis support method according to claim 15, wherein the vibration factor estimation step compares a first Q value obtained based on the first frequency characteristic and a second Q value obtained based on the second frequency characteristic with a predetermined Q value threshold when the deviation is less than the predetermined threshold, and the vibration factor estimation step estimates that there is a high possibility that a vibration inherent to the machine tool is occurring when both the first Q value and the second Q value are less than the predetermined Q value threshold and estimates that there is a high possibility of electrical noise occurring when at least one of the first Q value and the second Q value is equal to or greater than the predetermined Q value threshold.

* * * * *